United States Patent
Lai et al.

(10) Patent No.: US 7,301,871 B2
(45) Date of Patent: Nov. 27, 2007

(54) METHOD AND DEVICE FOR DETECTING THE SIGNAL ON A DISC HAVING A DEFECT BY UTILIZING AN RF SIGNAL AND ITS DERIVATIVES

(75) Inventors: Yi-Lin Lai, Taipei (TW); Yi-Chung Chan, Taipei (TW)

(73) Assignee: Via Technologies, Inc, Taipei (TW)

( * ) Notice: Subject to any disclaimer, the term of this patent is extended or adjusted under 35 U.S.C. 154(b) by 561 days.

(21) Appl. No.: 10/791,532

(22) Filed: Mar. 3, 2004

(65) Prior Publication Data

US 2005/0195717 A1 Sep. 8, 2005

(51) Int. Cl.
*G11B 27/36* (2006.01)

(52) U.S. Cl. .................. 369/53.15; 369/47.14

(58) Field of Classification Search ............. 369/53.15, 369/47.14
See application file for complete search history.

(56) References Cited

U.S. PATENT DOCUMENTS

| | | | |
|---|---|---|---|
| 6,862,088 B2* | 3/2005 | Song et al. ............... | 356/237.2 |
| 2002/0172111 A1* | 11/2002 | Tsai et al. ................ | 369/47.28 |
| 2003/0091350 A1* | 5/2003 | Lai et al. .................... | 398/153 |
| 2003/0223335 A1* | 12/2003 | Chen ....................... | 369/53.15 |
| 2006/0250913 A1* | 11/2006 | Kim ........................ | 369/53.11 |

* cited by examiner

*Primary Examiner*—Thang V. Tran
*Assistant Examiner*—LaTanya Bibbins
(74) *Attorney, Agent, or Firm*—The Nath Law Group; Harold L. Novick; Matthew Moffa

(57) ABSTRACT

The device includes a servo control unit, a data path control unit, a defect detection unit, and a logic combination unit. The data path control unit further includes a preamplifier receiving data from a lens and generating RF signals for data process. The defect detection unit receives the various signals for detecting different kinds of defects to set corresponding defect flag signals. The defect detection unit includes means for ADefect1 detection, means for EFMDefect detection, means for RPDefect detection, means for Interruption detection, means for ADefect detection, and means for DSPDefect detection.

14 Claims, 6 Drawing Sheets

METHOD AND DEVICE FOR DETECTING THE SIGNAL ON A DISC HAVING A DEFECT BY UTILIZING AN RF SIGNAL AND ITS DERIVATIVES

BACKGROUND OF THE INVENTION

1. Field of the Invention

This invention generally relates to the field of signal detection. More particularly, the present invention relates to a method and device that detects the signal on a defect disc.

2. Description of the Prior Art

Nowadays, disc-type storage media are broadly used in keeping data due to their storage capacity. Such disc-type storage media like optical discs, i.e. CD-R discs, CD-RW discs, DVD-R discs, DVD-RW discs, DVD+R discs, DVD+RW discs, or DVD-RAM discs etc., also provide better protection to the data stored on them against damage. However, these characteristics mentioned above do not mean the optical discs are faultless storage media for storing data because some defects might take place on their bare surfaces. For example, a deep scratch, a shallow scratch, and even a fingerprint. These defects could result in not only reading or writing errors but also a system disturbance while the system reads or writes data. Hence, it is an important thing to detect existing defects for protecting the system from a disturbed or instable situation.

It is well known to use the difference of signal amplitude, such as an RF level (RFLVL) or a sub-beam added (SBAD) signal, to detect an existing defect. As shown in FIG. 1A, a defect detection applying the RFLVL is illustrated. An RF signal 110 has a hollow region 112 in a time period 120. That means the corresponding data of the hollow region 112 is damaged by a defect, so that the RF signal 110 in the time period 120 cannot be read out. Further, the depth of the hollow region 112 represents the depth of the defect. An RFLVL signal 114, which is formed from the RF signal 110 passing a low pass filter, shows the envelope of the RF signal 110. A detection threshold 130 is a fixed DC referred voltage level. As the RFLVL signal 114 is lower than the detection threshold 130 in the time period 120, a defect flag signal 140 is raised from "0" to "1". Moreover, a FE/TE signal 150 respectively generates a positive surge 152 and a negative surge 154 at the beginning and the end of the time period 120 to indicate a focusing and a tracking error signal. However, while the defect flag signal 140 is set from "0" to "1", a servo system, such as a focusing and a tracking servo, and a data path control system, such as a preamplifier, a slicer, or a phase lock loop (PLL), can reduce the potential disturbance and instability through applying some appropriately protective methods and devices.

Referring to FIG. 1B, an RF signal 110-1 has a hollow region 112-1 in a time period 120-1. That also means the corresponding data of the hollow region 112-1 is damaged by a defect, so that the RF signal 110-1 in the time period 120-1 cannot be totally read out. But, the depth of the hollow region 112-1 is not deep as the hollow region 112 shown in FIG. 1A, since it might just result from a shallow defect, such as a shallow scratch. An RFLVL signal 114-1 shows the envelope of the RF signal 110-1. A detection threshold 130-1 is a fixed DC referred voltage level like the detection threshold 130 shown in FIG. 1A. Obviously, the RFLVL signal 114-1 is always higher than the detection threshold 130-1 because the shallow defect does not make the hollow region 112-1 deep enough. Hence, not only a defect flag signal 140-1 has no response to the shallow defect, but also a FE/TE signal 150-1 has no apparently change except a little noise. Furthermore, since the shallow defect is not detected, some protective methods and devices are not triggered to protect the system from the potential disturbance and instability. In other words, the servo systems and the data path control systems are easily affected by the disturbance and instability in this defect situation.

Similarly, referring to FIG. 1C, an RF signal 110-2 has a hollow region 112-2 in a time period 120-2. That means the corresponding data of the hollow region 112-2 is slightly affected by a defect, so that the RF signal 110-2 in the time period 120-2 has weaker amplitudes. Also, the depth of the hollow region 112-2 is not deep like the hollow region 112-1 shown in FIG. 1B, since it might only result from a shallow defect, such as a fingerprint. An RFLVL signal 114-2 shows the envelope of the RF signal 110-2 and a detection threshold 130-2 is a fixed DC referred voltage level like the detection threshold 130 shown in FIG. 1A. The RFLVL signal 114-2 is always higher than the detection threshold 130-2 in this defect situation, because the shallow defect does not make the hollow region 112-2 deep enough. Thus, not only a defect flag signal 140-2 has no response to the shallow defect, but also a FE/TE signal 150-2 has no apparently change except a little noise. This situation is similar to the situation described in FIG. 1B; the servo systems and the data path control systems cannot be safely protected. On the other hand, however, the defects shown in FIG. 1B and FIG. 1C further include different statuses according to their damaged depth, width and direction; some defects might still have original data, but others have only destroyed data. Therefore, it is difficult to determine the defect flag signal simply by the detection threshold comparison.

In view of the drawbacks mentioned with the prior art of defect signal detection, there is a continued need to develop a new and improved method and device that overcomes the disadvantages associated with the prior art of defect signal detection. The advantages of this invention are that it solves the problems mentioned above.

SUMMARY OF THE INVENTION

In accordance with the present invention, a method and device for detecting the signal on a defect disc substantially obviates one or more of the problems resulted from the limitations and disadvantages of the prior art mentioned in the background.

Accordingly, one object of the present invention is to provide a method and device for distinguishing defects from different depths to improve the threshold comparison.

Another object is to provide a method and device for detecting defects according to various detective criteria, so that the defect detection can be more precisely.

Still another object is to provide a method and device for detecting the signal on a defect disc in order to apply an appropriate method and device to protect the system from disturbance and instability.

According to the aforementioned objects, the present invention provides a device for detecting the signal on a defect disc. The device includes a servo control unit, a data path control unit, a defect detection unit, and a logic combination unit. The servo control unit handles the spin rate of a spindle motor, the move of a sled motor, and the slightly tracking and focusing move of a lens. The data path control unit further includes a preamplifier receiving data from the lens and generating RF signals for data process, servo control signals for the servo control unit and various signals for defect detection; a slicer receiving and digitalizing the RF signals; a phase lock loop (PLL) synchronizing the digitalized RF signals to a system clock and counting the length of the digitalized RF signals; and a decoder decoding the length of the digitalized RF signals to a host. The defect detection unit receives the various signals for detecting different kinds of defects to set corresponding defect flag signals. The logic combination unit runs an appropriate logic operation on the defect flag signals in order to trigger defect protection for the servo control unit and the data path control unit.

The present invention further discloses a method for detecting the signal on a defect disc. The method includes detecting a deep defect; detecting a shallow defect and a fingerprint; detecting an abnormal data length; detecting data interruption; detecting a defect through applying a variable threshold; and running an appropriate logic operation on the defect flag signals to identify a defect.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figure 1:
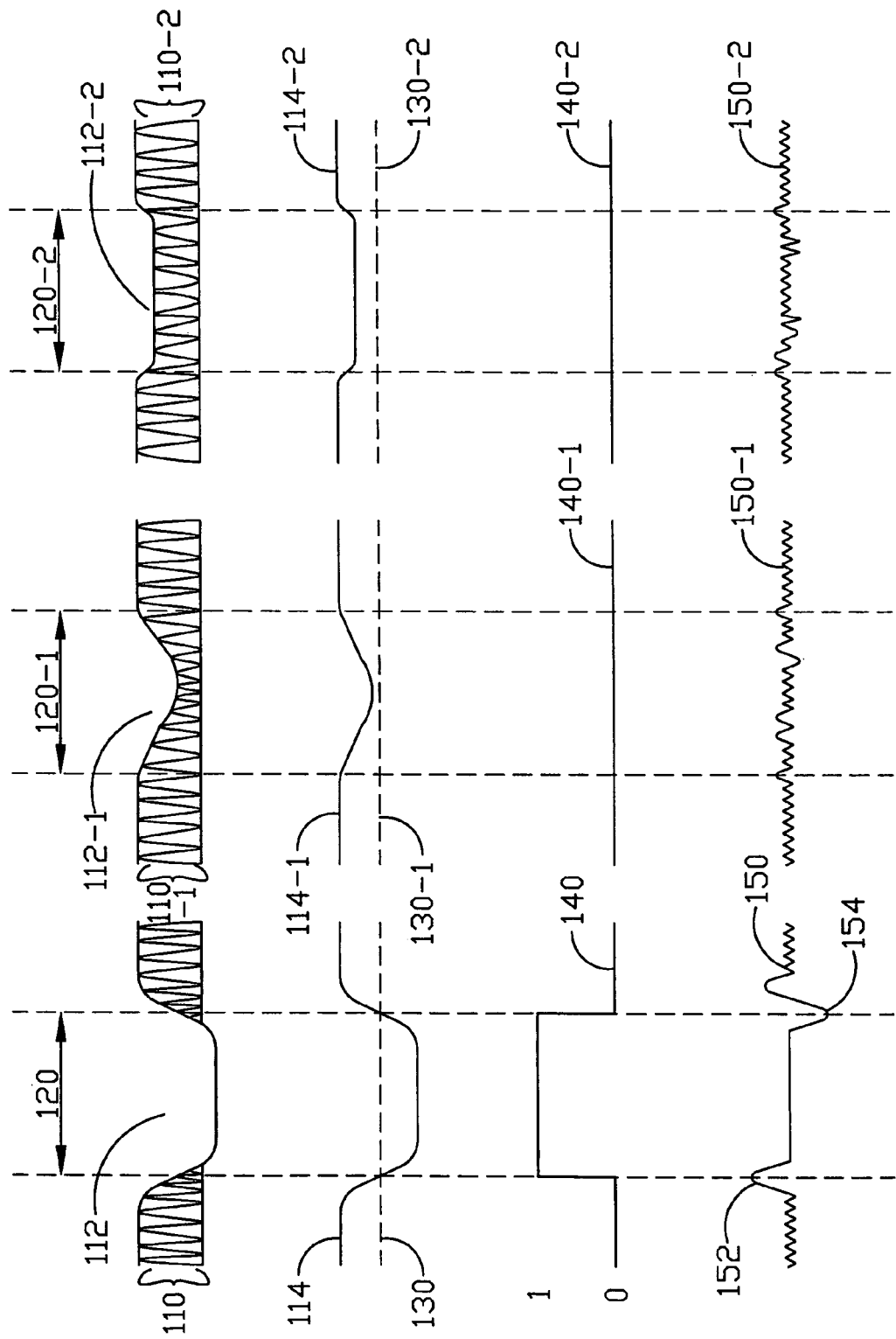
FIG. 1A illustrates signals of a deep defect detected by applying well-known RFLVL detection.
FIG. 1B illustrates signals of a shallow defect detected by applying well-known RFLVL detection.
FIG. 1C illustrates signals of a fingerprint detected by applying well-known RFLVL detection.
Figure 2:
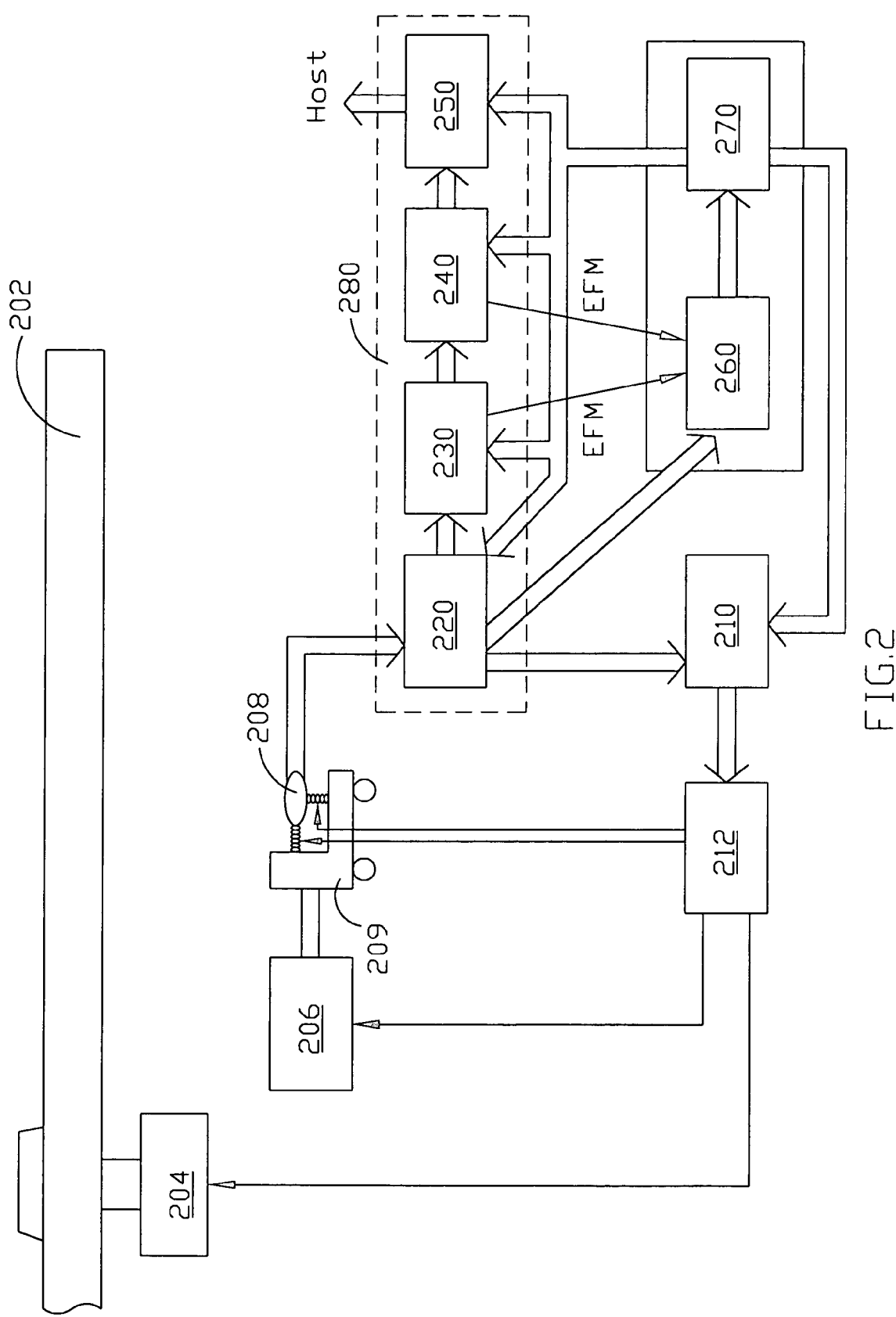
FIG. 2 illustrates a schematic defect detection device block diagram in accordance with the present invention.

As shown in FIG. 2, a schematic embodiment block diagram for detecting the signal on a defect disc is illustrated. A servo control unit 210 handles related electromechanical devices, such as the spin rate of a spindle motor 204, the move of a sled motor 206, and the slightly tracking and focusing move of a lens 208, through a power driver 212. That is, the servo control unit 210 can make the lens 208 not only aim at the right track of a disc 202 but also have a well focus for data reading and transferring. Through roughly moving a pick-up head 209 and slightly tracking move of the lens 208 at the horizontal direction, and slightly focusing move of the lens 208 at the vertical direction, the servo control unit 210 can make the lens 208 focus well on the right track of the disc 202. A data path control unit 280 includes a preamplifier 220, a slicer 230, a phase lock loop (PLL) 240, and a decoder 250. The preamplifier 220 receives data signals from the lens 208 and generates various signals, such as RF signals for data process, servo control signals, i.e. a FE/TE signal, for the servo control unit 210, and other signals, i.e. eight to fourteen modulation (EFM) signals and RF level (RFLVL) signals, etc., for defect detection. The slicer 230 digitalizes the RF signals transferred from the preamplifier 220. The PLL 240 synchronizes the digitalized RF signals to a system clock and counts the length of the digitalized RF signals according to the system clock. The decoder 250 decodes the length of the digitalized RF signal to a host (not shown). A defect detection unit 260 receives the various signals from the preamplifier 220 and EMF signals from the slicer 230 and the PLL 240 for detecting different kinds of defects through different defect detection in order to set corresponding defect flag signals. Wherein, the different defect detection includes ADefect detection, ADefect1 detection, EFMDefect detection, RPDefect detection, Interruption detection, and DSPDefect detection. A logic combination unit 270 executes an appropriate logic operation, simply, such as an OR operation or an AND operation, on the defect flag signals to precisely improve the defect detection. As the operation result indicates in a defect situation, the logic combination unit 270 triggers defect protection methods and devices to protect the corresponding units, such as the servo control unit 210, the preamplifier 220, the slicer 230, the PLL 240, and the decoder 250.

Figure 3A:
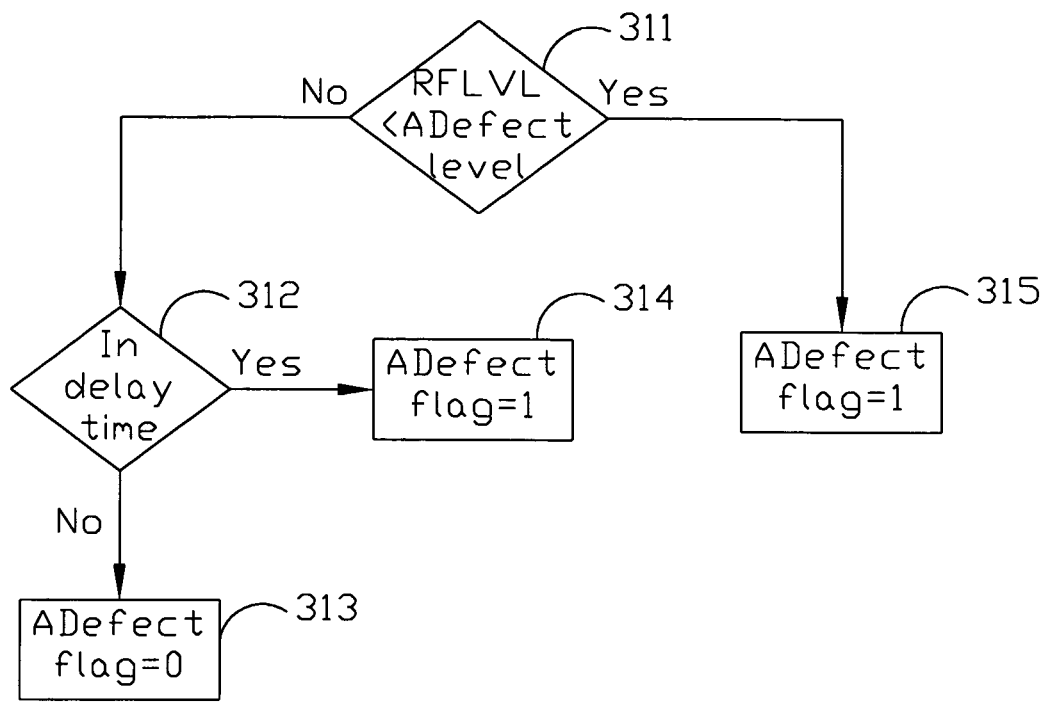
FIGS. 3A~3F illustrate flow charts of the defect detection in according with the present invention.

As shown in FIGS. 3A~3F, flow charts of raising defect flag signals in different defect detection methods are illustrated. Referring to FIG. 3A, ADefect detection is illustrated. In step 311, comparing an RFLVL signal with an ADefect level. Wherein the RFLVL signal is the envelope of an RF signal and the ADefect level is a fixed DC referred voltage level. An ADefect flag is set to "1" in step 315 while the RFLVL signal is lower than the ADefect level. Also, the ADefect flag is set to "1" in step 314 while the RFLVL signal is higher than the ADefect level but is in defect delay time in step 312. However, while the RFLVL signal is higher than the ADefect level and is not in the defect delay time, the ADefect flag is set to "0" in step 313. The ADefect detection is appropriately used for detecting a deep defect, such as a scratch.

Figure 3B:
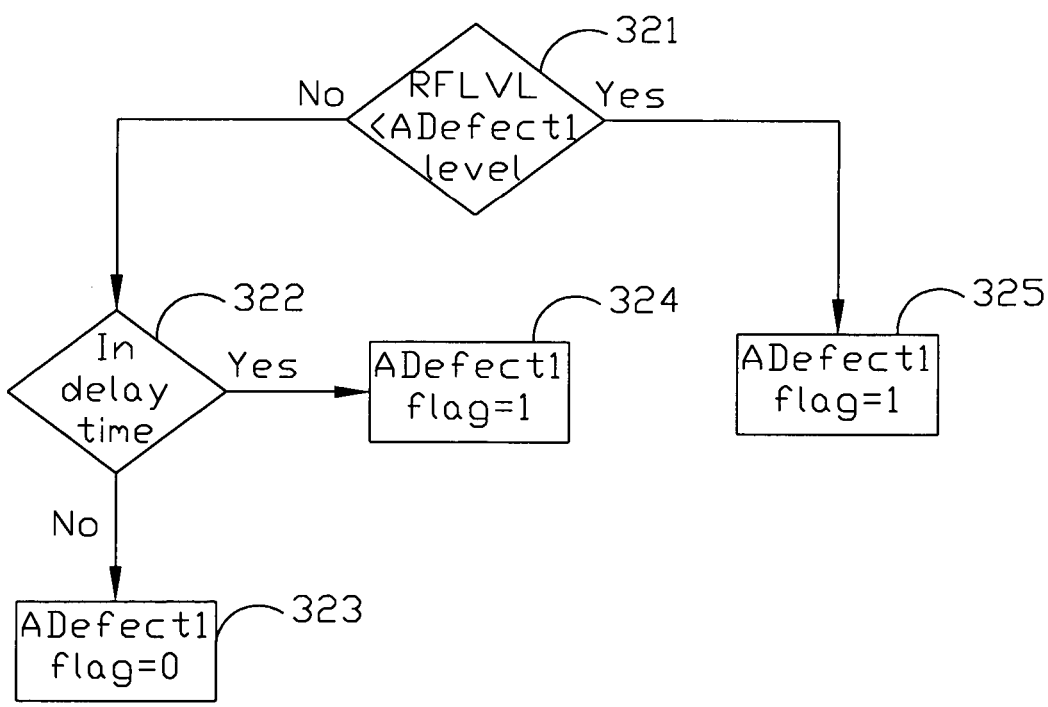

Referring to FIG. 3B, ADefect1 detection is illustrated. All steps in FIG. 3B are similar to those in FIG. 3A. An ADefect1 flag is respectively set to "1" in steps 325 and 324 while the RFLVL signal is lower than the ADefect1 level after comparing step 321 and is higher than the ADefect1 level but in defect delay time in step 312. Also, while the RFLVL signal is higher than the ADefect1 level and is not in the defect delay time, the ADefect1 flag is set to "0" in step 323. The main difference between the ADefect level and the ADefect1 level is that the ADefect1 level is higher than the ADefect level so that the ADefect1 detection can be more sensitive for a shallow defect and a fingerprint than the ADefect detection does.

Figure 3C:
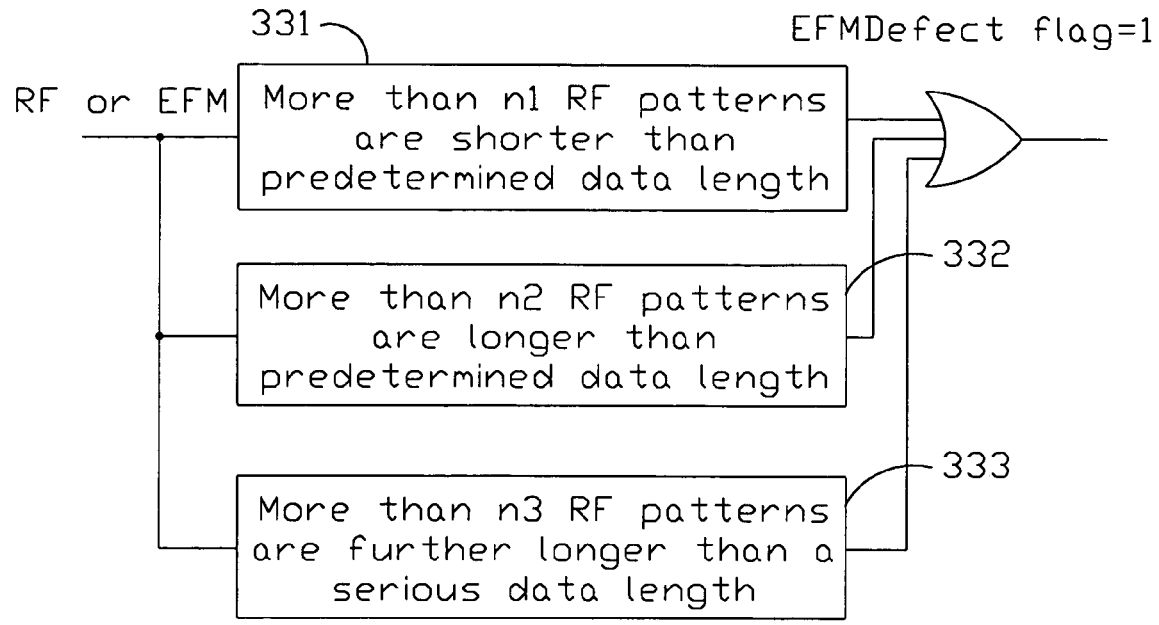

Referring to FIG. 3C, EFMDefect detection is illustrated. In step 331, while a data sector or a data frame has more than n1 RF patterns are shorter than a first predetermined data length, the EFMDefect flag is set to "1". For example, the first predetermined data length is 3T for both CD and DVD data. In step 332, while the data sector or the data frame has more than n2 RF patterns are longer than a second predetermined data length, the EFMDefect flag is set to "1". For example, the second predetermined data length is respectively 11T and 14T for CD and DVD data. In step 333, while the data sector or the data frame has more than n3 RF patterns are longer than a serious data length, such as 18T, the EFMDefect flag is set to "1". On the other hand, while a data sector or a data frame has more than n4RF patterns are between the first and the second predetermined data length, the EFMDefect flag is set to "0". The EFMDefect detection is appropriately used for detecting an abnormal data length and it is real-time defect detection. Wherein, the EFMDefect detection is more sensitive while the variables n1, n2, n3, and n4 have small values.

Figure 3D:
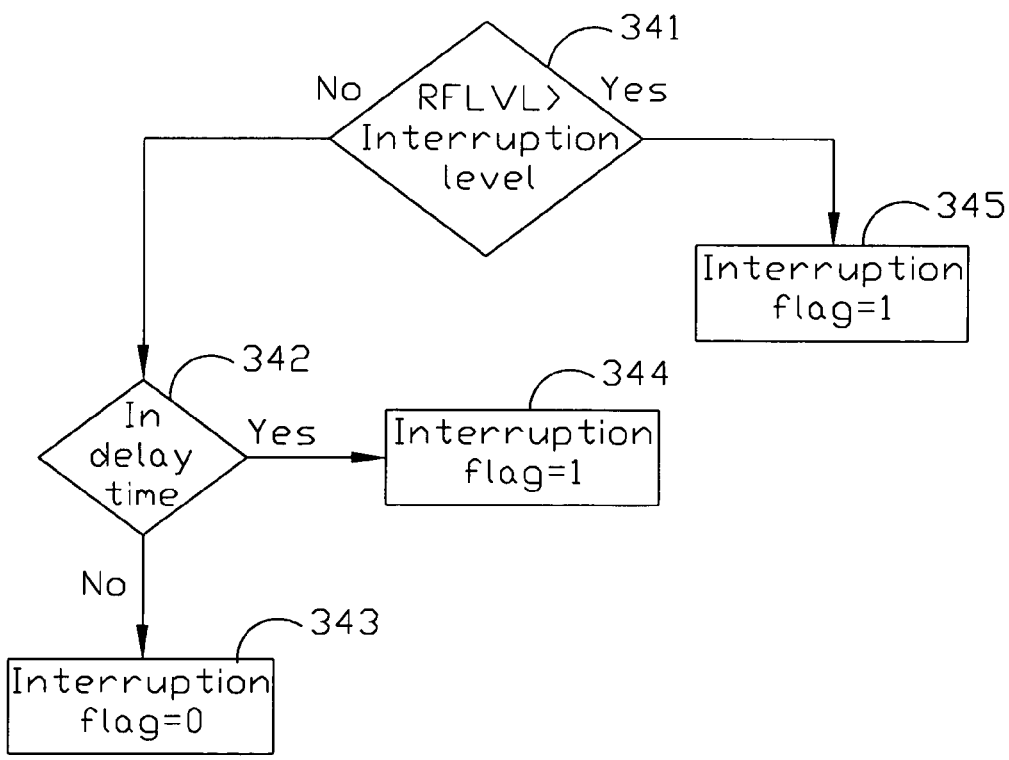

Referring to FIG. 3D, Interruption detection is illustrated. All steps in FIG. 3D are similar to those in FIG. 3A. An Interruption flag is respectively set to "1" in steps 345 and 344 while the RFLVL signal is higher than the Interruption level after comparing step 341 and is lower than the Interruption level but in defect delay time in step 342. Also, while the RFLVL signal is lower than the Interruption level and is not in the defect delay time, the Interruption flag is set to "0" in step 343. The Interruption level setting is higher than the RFLVL signal in order to detect a defect resulted from strong reflection.

Figure 3E:
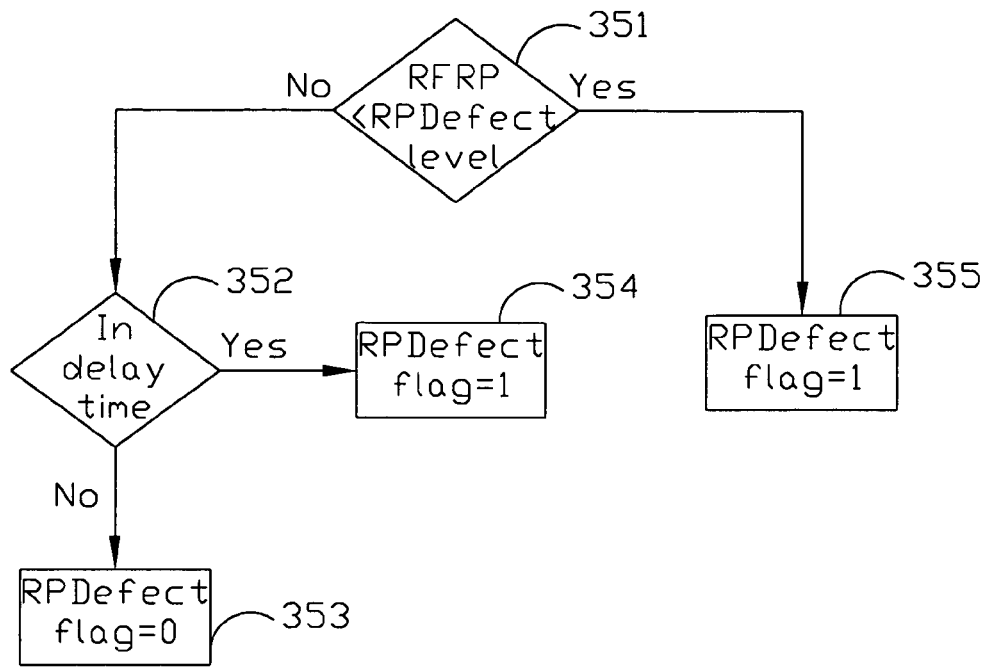

Referring to FIG. 3E, RPDefect detection is illustrated. All steps in FIG. 3E are similar to those in FIG. 3A. An RPDefect flag is respectively set to "1" in steps 355 and 354 while the RFRP signal is lower than the RPDefect level after comparing step 351 and is higher than the RPDefect level but in defect delay time in step 352. Wherein, the RFRP signal could be the peak or the bottom envelope of an RF signal and also could be the peak to the bottom of the RF signal. Moreover, while the RFRP signal is higher than the RPDefect level and is not in the defect delay time, the RPDefect flag is set to "0" in step 353. The RPDefect detection detects a defect via further processing the RF signal thus it is more sensitive for detecting defects. Due to its sensitive ability to detect defects, the RPDefect detection is suitably used to detect a small scratch and an interruption defect.

Figure 3F:
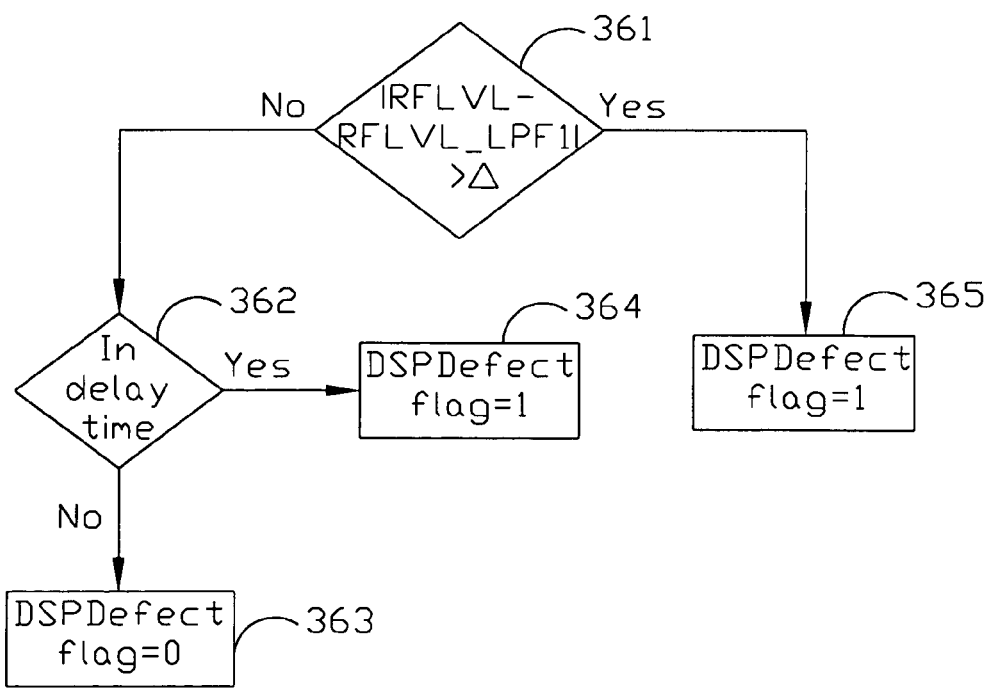

Referring to FIG. 3F, DSPDefect detection is illustrated. All steps in FIG. 3F are similar to those in FIG. 3A. A DSPDefect flag is correspondingly set to "1" in steps 365 and 364 while an absolute difference value between an RFLVL and an RFLVL_LPF is bigger than a predetermined threshold after comparing step 361 and is smaller than the predetermined threshold but in defect delay time in step 362. Wherein, the RFLVL_LPF signal is a slowly falling signal of the RFLVL signal passed a low pass filter. Moreover, while the absolute difference value is smaller than the predetermined threshold and is not in the defect delay time, the DSPDefect flag is set to "0" in step 363. The DSPDefect detection detects a defect through a variable threshold thus a fixed DC referred voltage level is unnecessary.

Figure 4:
FIG. 4 illustrates different defect signals detected by applying the defect detection in accordance with the present invention.

As shown in FIG. 4, some defect signals detected by applying the defect detection in accordance with the present invention are illustrated. An RF signal 41 has a deep hollow thus its envelope signal 411 also has the deep hollow. According to the ADefect1 and the ADefect detection mentioned before, an ADefect1 flag signal 416 and an ADefect flag signal 415 are respectively set from "0" to "1" while the envelope signal 411 is lower than an ADefect1 level 402 and an ADefect level 401. The EFMDefect flag signal 417 is set from "0" to "1" as well because the hollow is wide enough and generates abnormal data length. The Interruption flag signal 419 has no response to the hollow since the envelope signal 411 is always smaller than an Interruption level 404. An RFRP signal 412 and an RFRP signal 413 respectively show the peak envelope and the inversed bottom envelope of the RF signal 41. Further, an RFRP signal 414 is formed through the RFRP signal 412 subtracting the RFRP signal 413. An RPDefect flag signal 418 is set from "0" to "1" as the RFRP signal 414 is lower than an RPDefect level 405. The deep hollow caused by a deep defect, such as a scratch, can be detected out through the ADefect, the ADefect1, the EFMDefect, and the RPDefect detection, since its depth and width are deep and wide enough for the defect detection.

An RF signal 42 has a shallow and narrow hollow thus its envelope signal 421 also has the same form. According to the ADefect1 detection, an ADefect1 flag signal 426 is set from "0" to "1" while the envelope signal 421 is lower than the ADefect1 level 402. An RFRP signal 422 and an RFRP signal 423 respectively show the peak envelope and the inversed bottom envelope of the RF signal 42. Further, an RFRP signal 424 is formed through an RFRP signal 422 subtracting an RFRP signal 423. An RPDefect flag signal 428 is set from "0" to "1" as the RFRP signal 424 is lower than the RPDefect level 405. However, an ADefect flag signal 425, an EFMDefect flag signal 427, and an Interruption flag signal 429 have no response to the shallow and narrow hollow, since the envelope signal 421 is always higher than the ADefect level 401, unsatisfying the conditions of the EFMDefect detection mentioned before, and is always lower than the Interruption level 404, respectively. The shallow and narrow hollow probably caused by a shallow scratch can be only detected out through the ADefect1 and the RPDefect detection, since its depth and width are insufficient for other defect detection.

An RF signal 43 has a shallow and wide hollow thus its envelope signal 431 also has the same form. An ADefect1 flag signal 436 is set from "0" to "1" while the envelope signal 431 is lower than the ADefect1 level 402. An EFMDefect flag signal 437 is set from "0" to "1" as well, because the hollow is wide enough and generates abnormal data length. An RFRP signal 432 and an RFRP signal 433 respectively show the peak envelope and the inversed bottom envelope of the RF signal 43. Further, an RFRP signal 434 is formed through the RFRP signal 432 subtracting the RFRP signal 433. An RPDefect flag signal 438 is set from "0" to "1" as the RFRP signal 434 is lower than the RPDefect level 405. However, an ADefect flag signal 435 and an EFMDefect flag signal 437 have no response to the shallow and width hollow, since the envelope signal 431 is always higher than the ADefect level 401 and is always lower than the Interruption level 404. The shallow and wide hollow possibly caused by a shallow defect can be only detected out through the ADefect1, the EFMDefect and the RPDefect detection, since its depth and width are insufficient for other defect detection.

An RF signal 44 has a shallow and wide hollow thus its envelope signal 441 also has the same form. An ADefect1 flag signal 446 is set from "0" to "1" while the envelope signal 441 is lower than the ADefect1 level 402. An RFRP signal 442 and an RFRP signal 443 respectively show the peak envelope and the inversed bottom envelope of the RF signal 44. Further, an RFRP signal 444 is formed through the RFRP signal 442 subtracting the RFRP signal 443. An RPDefect flag signal 448 has no response to the shallow and width hollow, since the RFRP signal 444 is always higher than the RPDefect level 405. Moreover, an ADefect flag signal 445, an EFMDefect flag signal 447, and an Interruption flag signal 449 neither have no response to the shallow and wide hollow, since the envelope signal 441 is always higher than the ADefect level 401, unsatisfying the conditions of the EFMDefect detection mentioned before, and is always lower than the Interruption level 404, respectively. The shallow and wide hollow probably resulted from a fingerprint can be just detected out via the ADefect1 detection in this situation, since its depth and width are very deficient for other defect detection.

As for an RF signal 45 and an RF signal 46, both of them are caused from strong signal strengths, such as strong optical reflection, also called an interruption defect. The RF signal 45 has strong amplitudes at its peak and its bottom envelope thus its peak envelope signal 451 has the corresponding form. An EFMDefect flag signal 457 is set from "0" to "1" since the interruption defect is wide enough and generates abnormal data length. An Interruption flag signal 459 is also set from "0" to "1" as the envelope signal 451 is higher than the Interruption level 404. As for other flag signals, an ADefect1 flag signal 456 and an ADefect flag signal 455 have no response to the envelope signal 451 because the envelope signal 451 is always higher than the ADefect1 level 402 and the ADefect level 401. An RFRP signal 452 and an RFRP signal 453 respectively show the peak envelope and the inversed bottom envelope of the RF signal 45. Further, an RFRP signal 454 is formed through the RFRP signal 452 subtracting the RFRP signal 453. An RPDefect flag signal 458 has no response to this kind of interruption defect, since the RFRP signal 454 is higher than the RPDefect level 405 at all times. This kind of interruption defect can be just detected out via the EFMDefect and the Interruption detection mentioned before.

The RF signal 46 forms an inversed hollow from its bottom envelope thus its peak envelope signal 461 has the corresponding form. An EFMDefect flag signal 467 is set from "0" to "1" since the interruption defect is wide enough and generates abnormal data length. An RFRP signal 462 and an RFRP signal 463 respectively show the peak envelope and the inversed bottom envelope of the RF signal 46. Further, an RFRP signal 464 has a deep hollow formed by the RFRP signal 462 subtracting the RFRP signal 463. An RPDefect flag signal 468 is set from "0" to "1" while the RFRP signal 464 is lower than the RPDefect level 405. An Interruption flag signal 469 is set from "0" to "1" while the envelope signal 461 is higher than the Interruption level 404. However, an ADefect1 flag signal 466 and an ADefect flag signal 465 have no response to the signal 461 because the envelope signal 461 is higher than the ADefect1 level 402 and the ADefect level 401. This kind of interruption defect can be only detected out via the EFMDefect, the RPDefect, and the Interruption detection mentioned before.

Generally speaking, the ADefect1 detection is more suitable than the ADefect detection for small and shallow scratch detection. The RPDefect detection is more sensitive for small scratch detection. Hence, it should be understood that the defect detection mentioned in the present invention could be combined in variety for particular defect detection. For example, combining the ADefect1 and the EFMDefect detection via a logic "OR" operation for small scratch detection, or combining the ADefect1 and the EFMDefect detection via a logic "AND" operation for small scratch detection except unwanted fingerprint, etc.

Although specific embodiments have been illustrated and described, it will be obvious to those skilled in the art that various modifications may be made without departing from what is intended to be limited solely by the appended claims.

What is claimed is:

1. A device for detecting a signal on a defect disc, said device comprising:

a servo control unit handling related electromechanical devices of said device;

a preamplifier receiving data from a lens and generating an RF signal for data process, servo control signals for said servo control unit and various signals for defect detection;

a slicer receiving and digitalizing said RF signal so as to generate digitalized RF signal;

a phase lock loop (PLL) synchronizing said digitalized RF signal to a system clock and counting the length of said digitalized RF signal;

a decoder decoding the length of said digitalized RF signal to a host;

a defect detection unit receiving said various signals for detecting different kinds of defects to set corresponding defect flag signals, wherein said defect detection unit includes means for ADefect1 detection, means for EFMDefect detection, means for RPDefect detection, means for Interruption detection, means for ADefect detection, and means for DSPDefect detection; and a logic combination unit running a suitable logic operation on said defect flag signals for detecting a particular defect;

wherein said defect detection unit further receives eight to fourteen modulation (EFM) signals from said slicer and said PLL;

wherein said means for EFMDefect detection further includes:

comparing data length of each said EFM signal in a data frame with a first predetermined data length, and setting a second corresponding flag signal when more than a first predetermined number of EFM signals have a data length shorter than said first predetermined data length;

comparing data length of each said EFM signal in said data frame with a second predetermined data length, and setting said second corresponding flag signal when more than a second predetermined number of EFM signals have a data length longer than said second predetermined data length;

comparing data length of each said EFM signal in said data frame with a third predetermined data length, and setting said second corresponding flag signal when more than a third predetermined number of EFM signals have a data length longer than said third predetermined data length; and resetting said second corresponding flag signal after more than a fourth predetermined number of EFM signals have a data length that is between said first and said second predetermined data lengths; and wherein said second predetermined data length is greater than said first predetermined data length, and said third predetermined data length is greater than said second predetermined data length.

2. The device according to claim 1, wherein said related electromechanical devices include a spindle motor, a sled motor, and means for a lens slightly tracking and focusing move.

3. The device according to claim 1, wherein said servo control signals further includes a focusing error (FE) signal and a tracking error (TE) signal.

4. The device according to claim 1, wherein said various signals at least include an envelope signal of said RF signal.

5. The device according to claim 4, wherein said means for ADefect1 detection compares said envelope signal with a first threshold level, which is higher than an ADefect detection level, and sets a first corresponding flag signal when said envelope signal is lower than said first threshold level.

6. The device according to claim 1, wherein said means for RPDefect detection compares an RFRP signal with an RPDefect threshold level, which is higher than an ADefect detection level, and sets a third corresponding flag signal when said RFRP signal is lower than said RPDefect threshold level, wherein said RFRP signal is a peak envelope, a bottom envelope, or a peak-to-bottom envelope of said RF signal.

7. The device according to claim 4, wherein said means for Interruption detection compares said envelope signal with an interruption threshold level, and sets a fourth corresponding flag signal when said envelope signal is higher than said interruption threshold level.

8. A method for detecting a signal on a defect disc, said method comprising:
   utilizing ADefect1 detection for detecting a shallow defect and a fingerprint and generating a first corresponding flag signal;
   utilizing EFMDefect detection for detecting a predetermined data length and generating a second corresponding flag signal;
   utilizing RPDefect detection for detecting a small defect and a data interruption and generating a third corresponding flag signal;
   utilizing Interruption detection for detecting said data interruption and generating a fourth corresponding flag signal;
   utilizing ADefect detection for detecting a deep defect and generating a fifth corresponding flag signal;
   utilizing DSPDefect detection for detecting a defect through a variable threshold and generating a sixth corresponding flag signal; and
   running a suitable logic operation on said first, said second, said third, said fourth, said fifth, and said sixth corresponding flag signals for detecting a particular defect;
   wherein said EFMDefect detection further includes:
      comparing data length of each of EFM signals in a data frame with a first predetermined data length, and setting said second corresponding flag signal when more than a first predetermined number of EFM signals have a data length shorter than said first predetermined data length;
      comparing data length of each said EFM signal in said data frame with a second predetermined data length, and setting said second corresponding flag signal when more than a second predetermined number of EFM signals have a data length longer than said second predetermined data length;
      comparing data length of each said EFM signal in said data frame with a third predetermined data length, and setting said second corresponding flag signal when more than a third predetermined number of EFM signals have a data length longer than said third predetermined data length; and
      resetting said second corresponding flag signal after more than a fourth predetermined number of EFM signals have a data length that is between said first and said second predetermined data lengths; and
   wherein said second predetermined data length is greater than said first predetermined data length, and said third predetermined data length is greater than said second predetermined data length.

9. The method according to claim 8, wherein said ADefect1 detection compares an envelope signal of an RF signal with a first threshold level, which is higher than an ADefect detection level, and sets said first corresponding flag signal when said envelope signal is lower than said first threshold level.

10. The method according to claim 8, wherein said RPDefect detection compares an RFRP signal with an RPDefect threshold level, which is higher than an ADefect detection level, and sets said third corresponding flag signal when said RFRP signal is lower than said RPDefect threshold level, wherein said RFRP signal is a peak envelope, a bottom envelope, or a peak-to-bottom envelope of an RF signal.

11. The method according to claim 8, wherein said Interruption detection compares an envelope signal of an RF signal with an interruption threshold level, and sets said fourth corresponding flag signal when said envelope signal is higher than said interruption threshold level.

12. The device according to claim 1, wherein said DSPDefect detection means compares an absolute difference of said RF signal and a frequency-domain filtered RF signal with a DSPDefect threshold level, and sets a DSPDefect flag signal when said absolute difference is greater than said DSPDefect threshold level.

13. The method according to claim 8, wherein said DSPDefect detection compares an absolute difference of an RF signal and a frequency-domain filtered RF signal with a DSPDefect threshold level, and sets a sixth corresponding flag signal when said absolute difference is greater than said DSPDefect threshold level.

14. A device for detecting a signal on a defect disc, said device comprising:
   a servo control unit handling related electromechanical devices of said device;
   a preamplifier receiving data from a lens and generating an RF signal for data process, servo control signals for said servo control unit and various signals for defect detection;
   a slicer receiving and digitalizing said RF signal so as to generate digitalized RF signal;
   a phase lock loop (PLL) synchronizing said digitalized RF signal to a system clock and counting the length of said digitalized RF signal;
   a decoder decoding the length of said digitalized RE signal to a host;
   a defect detection unit receiving said various signals for detecting different kinds of defects to set corresponding defect flag signals, wherein said defect detection unit includes means for ADefect1 detection, means for EFMDefect detection, means for RPDefect detection, means for Interruption detection, means for ADefect detection, and means for DSPDefect detection; and
   a logic combination unit running a suitable logic operation on said defect flag signals for detecting a particular defect;
   wherein said ADefect1 detection means compares an envelope signal of said RF signal with a first threshold level, and sets a first corresponding flag signal when said envelope signal is lower than said first threshold level;
   wherein said EFMDefect detection means includes comparing data length of each said EFM signal in a data frame with a first predetermined data length, and setting a second corresponding flag signal when more than a first predetermined number of EFM signals have a data length shorter than said first predetermined data length;
   comparing data length of each said EFM signal in said data frame with a second predetermined data length, and setting said second corresponding flag signal when more than a second predetermined number of EFM signals have a data length longer than said second predetermined data length;

comparing data length of each said EFM signal in said data frame with a third predetermined data length, and setting said second corresponding flag signal when more than a third predetermined number of EFM signals have a data length longer than said third predetermined data length; and resetting said second corresponding flag signal after more than a fourth predetermined number of EFM signals have a data length that is between said first and said second predetermined data lengths; wherein said second predetermined data length is greater than said first predetermined data length, and said third predetermined data length is greater than said second predetermined data length; wherein said RPDefect detection means compares an RFRP signal with an RPDefect threshold level, which is higher than an ADefect detection level, and sets a third corresponding flag signal when said RFRP signal is lower than said RPDefect threshold level, wherein said RFRP signal is a peak envelope, a bottom envelope, or a peak-to-bottom envelope of said RF signal;

wherein said Interruption detection means compares said envelope signal with an interruption threshold level, and sets a fourth corresponding flag signal when said envelope signal is higher than said interruption threshold level;

wherein said DSPDefect detection means compares an absolute difference of said RE signal and a frequency-domain filtered RF signal with a DSPDefect threshold level, and sets a DSPDefect flag signal when said absolute difference is greater than said DSPDefect threshold level.

* * * * *